United States Patent
Rofougaran et al.

(10) Patent No.: US 7,729,724 B2
(45) Date of Patent: Jun. 1, 2010

(54) RF FRONT-END AND APPLICATIONS THEREOF

(75) Inventors: Ahmadreza (Reza) Rofougaran, Newport Coast, CA (US); Maryam Rofougaran, Rancho Palos Verdes, CA (US); Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 375 days.

(21) Appl. No.: 11/942,263

(22) Filed: Nov. 19, 2007

(65) Prior Publication Data

US 2009/0130993 A1    May 21, 2009

(51) Int. Cl.
*H04M 1/00* (2006.01)
*H04B 1/66* (2006.01)

(52) U.S. Cl. .................. 455/552.1; 455/550.1; 455/102

(58) Field of Classification Search .............. 455/552.1, 455/550.1, 91, 115.1, 73, 41.2, 102, 205
See application file for complete search history.

(56) References Cited

U.S. PATENT DOCUMENTS

| | | | |
|---|---|---|---|
| 7,183,949 B2 * | 2/2007 | Park | 341/61 |
| 7,242,961 B2 * | 7/2007 | Hansen | 455/552.1 |
| 7,463,176 B2 * | 12/2008 | Nariman et al. | 341/144 |
| 7,463,696 B2 * | 12/2008 | Simon | 375/295 |
| 7,564,922 B2 * | 7/2009 | Kim et al. | 375/297 |
| 2006/0276158 A1 * | 12/2006 | Okabe | 455/333 |
| 2007/0066243 A1 * | 3/2007 | Yamauchi et al. | 455/78 |

* cited by examiner

*Primary Examiner*—Sonny Trinh
(74) *Attorney, Agent, or Firm*—Garlick Harrison & Markison; Timothy W. Markison

(57) ABSTRACT

An RF front-end includes a receiver frequency band filter module, a low noise amplifier, a first power amplifier module, a second power amplifier module, and a transmit frequency band filter module. The receiver frequency band filter module filters a received RF signal and the low noise amplifier amplifies the signal in accordance with the first or the second RF front-end configuration signal. The first power amplifier module is enabled in accordance with the first RF front-end configuration signal to amplify the first outbound RF signal and the second power amplifier module is enabled in accordance with the second RF front-end configuration signal to amplify the second outbound RF signal. The transmitter frequency band filter module is enabled in accordance with the second RF front-end configuration signal to filter the second transmit RF signal.

24 Claims, 6 Drawing Sheets

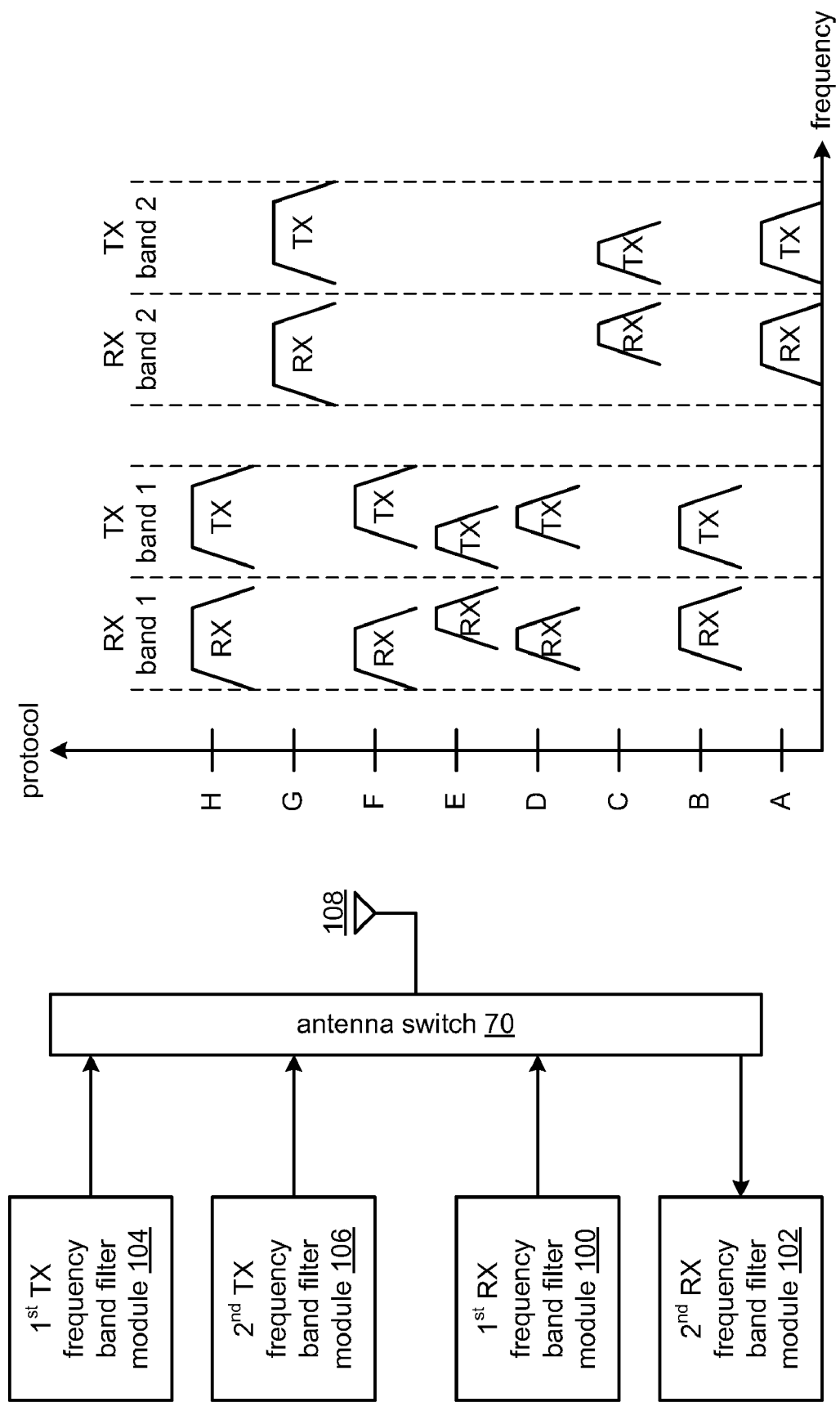

RF FRONT-END AND APPLICATIONS THEREOF

CROSS REFERENCE TO RELATED PATENTS

1. Entitled HIGH FREQUENCY COMMUNICATION DEVICE WITH MINIMAL OFF CHIP COMPONENTS, having a filing date of Nov. 2, 2007, and a Ser. No. 11/934,454;
2. Entitled AN IC FOR A HIGH FREQUENCY COMMUNICATION DEVICE WITH MINIMAL OFF CHIP COMPONENTS, having a filing date of Nov. 2, 2007, and a Ser. No. 11/934,504.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communications and more particularly to radio frequency transceivers.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

To support multiple wireless communication standards, which use different frequency bands and/or different modulation schemes, there is a growing desire to have common radio frequency portions of the transceiver support the multiple standards with minimal parts count.

Therefore, a need exists for a radio frequency (RF) front-end that supports multiple wireless communication protocols with minimal parts count.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 4 is a schematic block diagram of another embodiment of an RF front-end in accordance with the present invention;

FIG. 5 is a diagram of an example of various protocols in accordance with the present invention;

DETAILED DESCRIPTION OF THE INVENTION

Figure 1:
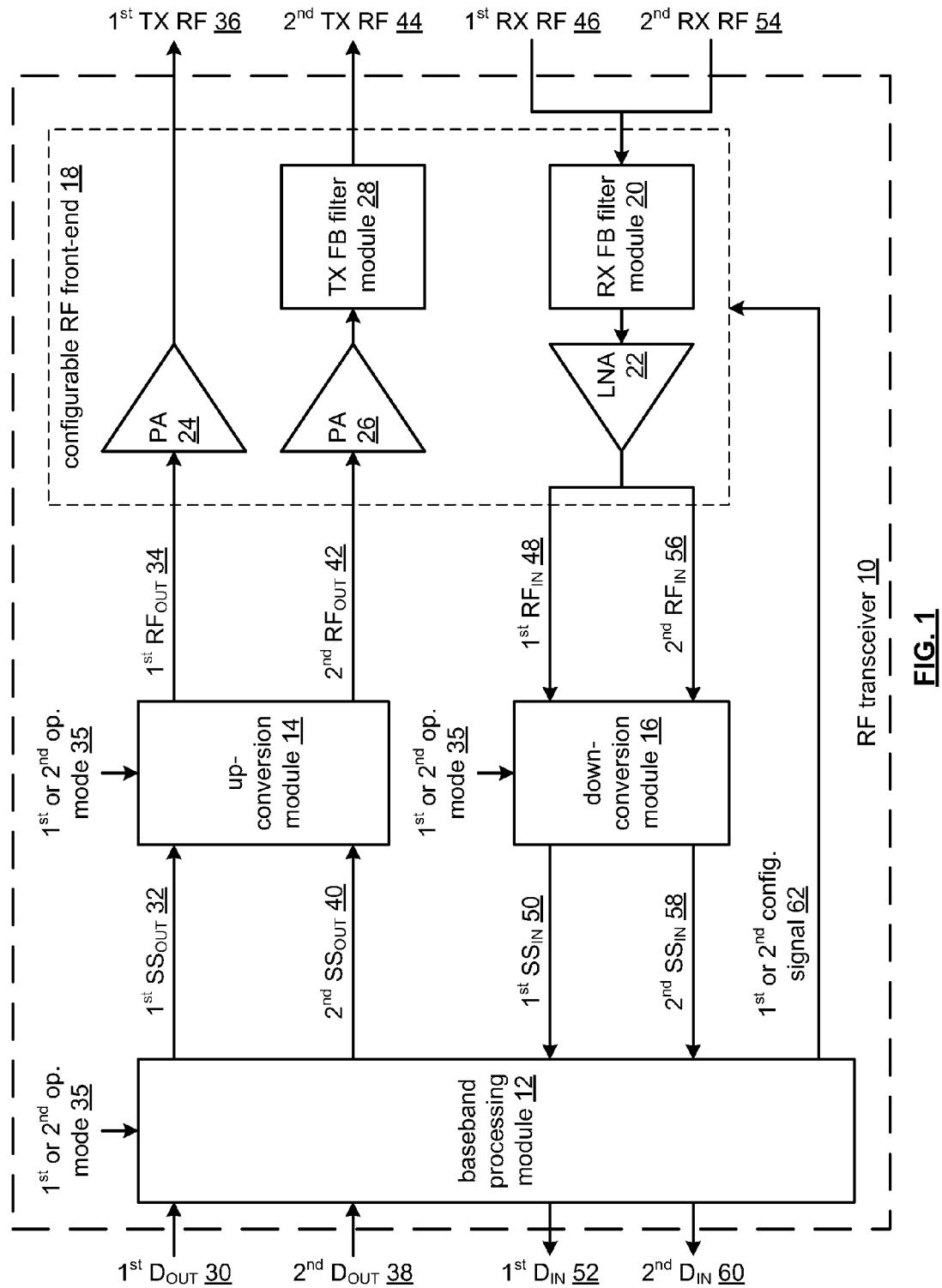
FIG. 1 is a schematic block diagram of an embodiment of an RF transceiver in accordance with the present invention.

FIG. 1 is a schematic block diagram of an embodiment of an RF transceiver 10 that includes a baseband processing module 12, an up-conversion module 14, a down-conversion module 16, and a configurable RF front-end 18. The configurable RF front-end 18 includes a receiver (RX) frequency band (FB) filter module 20, a low noise amplifier (LNA) 22, a first power amplifier (PA) module 24, a second power amplifier (PA) module 26, and a transmitter (TX) frequency band (FB) filter module 28.

The baseband processing module 12 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-7.

The baseband processing module 12 converts a first outbound signal, or data, 30 into a first outbound symbol stream (SS) 32 in accordance with one or more existing wireless communication standards, new wireless communication standards, modifications thereof, and/or extensions thereof (e.g., GSM, AMPS, digital AMPS, CDMA, EDGE, GPRS, HSUPA, HSDPA, WCDMA, etc.). The baseband processing module 12 may perform one or more of scrambling, encoding, constellation mapping, modulation, frequency spreading, frequency hopping, beamforming, space-time-block encoding, space-frequency-block encoding, and/or digital baseband to IF conversion to convert the first outbound data 30 into the first outbound symbol stream 32. Depending on the desired formatting of the first outbound symbol stream 32, the baseband processing module 12 may generate the first outbound symbol stream 32 as Cartesian coordinates (e.g., having an in-phase signal component and a quadrature signal component to represent a symbol), as Polar coordinates (e.g., having a phase component and an amplitude component to represent a symbol), or as hybrid coordinates as disclosed in co-pending patent application entitled HYBRID RADIO FREQUENCY TRANSMITTER, having a filing date of Mar. 24, 2006, and an application number of Ser. No. 11/388,822, and co-pending patent application entitled PROGRAMMABLE HYBRID TRANSMITTER, having a filing date of Jul. 26, 2006, and an application number of Ser. No. 11/494,682.

The up-conversion module 14 converts the first outbound symbol stream 32 into a first outbound RF signal 34 in accordance with the one or more existing wireless communication standards, new wireless communication standards, modifications thereof, and/or extensions thereof (e.g., GSM, AMPS, digital AMPS, CDMA, EDGE, GPRS, HSUPA, HSDPA, WCDMA, etc.). In one embodiment, the up-conversion module 14 receives the first outbound symbol stream 32 as Cartesian coordinates. In this embodiment, the up-conversion module 14 mixes the in-phase components of the first outbound symbol stream 32 with an in-phase local oscillation to produce a first mixed signal and mixes the quadrature components of the first outbound symbol stream 32 to produce a second mixed signal. The up-conversion module 14 then combines the first and second mixed signals to produce the first outbound RF signal 34.

The first power amplifier module 24, which may include one or more power amplifiers and/or power amplifier drivers coupled in series and/or in parallel, amplifies the first outbound RF signal 34 to produce a first transmit RF signal 36. The first transmit RF signal 36 may be transmitted via one or more antennas (not shown).

In other embodiments, the up-conversion module 14 receives the first outbound symbol stream 32 as Polar or hybrid coordinates. In these embodiments, the up-conversion module 14 modulates a local oscillation based on phase information of the first outbound symbol stream 32 to produce a phase modulated RF signal as the first outbound RF signal 34. The PA module 24 then amplifies the phase modulated RF signal in accordance with amplitude information of the first outbound symbol stream 32 to produce the first transmit RF signal 6. Alternatively, the first PA module 24 may amplify the phase modulated RF signal in accordance with a power level setting to produce the first transmit RF signal 36.

The baseband processing module 12 processes the second outbound signal, or data, 38 in accordance with the same protocol as it processed the first outbound data 30 or in accordance with a different protocol to produce a second outbound symbol stream 40. The up-conversion module 14 processes the second outbound symbol stream 40 in accordance with the same protocol as it processed the first outbound symbol stream 32 or in accordance with a different protocol to produce a second outbound RF signal 42.

The second power amplifier module 26, which may include one or more power amplifiers and/or power amplifier drivers coupled in series and/or in parallel, amplifies the second outbound RF signal 42 to produce an amplified second outbound RF signal. The TX frequency band filter module 28, which may be a bandpass filter, a surface acoustic wave (SAW) filter, or a transmitter portion of a duplexer, filters the amplified second outbound RF signal to produce a second transmit RF signal 44. In an embodiment, the TX frequency band filter module 28 has a frequency response corresponding to a transmit channel of one or more wireless communication standards. For example, the TX frequency band filter module 28 may have a frequency response in the range of 1710-1785 MHz to accommodate GSM 1800, WCDMA Bands III, IV, and IX. As another example, the TX frequency band filter module 28 may have a frequency response in the range of 1920-1990 MHz to accommodate WCDMA Bands I and II.

For received (RX) RF signals 46 and 54, the receive frequency band filter module 20 filters one of the received RF signals 46 and 54. The received RF signals 46 and 54 will typically be formatted in accordance with different protocols (e.g., HSDPA, WCDMA for one signal and GSM, EDGE, GPRS for the other) but will have similar down link bandwidths. For example, PCS1800 has a down link bandwidth of 1805-1880 MHz, while WCDMA Band II has a down link bandwidth of 1850-1910, Band III has a down link bandwidth of 1805-1880, and Band IX has a down link bandwidth of 1850-1880 MHz. With these down link bandwidths, the receive frequency band filter module 20, which may be a bandpass filter, a SAW filter, or a receive portion of a duplexer, may have a frequency response to filter these four protocols (e.g., frequency response having a bandpass region of 1805-1910 MHz) or it may have a frequency response to filter less than all four (e.g., 1805-1880 MHz). In another embodiment, the receive frequency band filter module 20 may have an adjustable frequency response within a range of frequencies. For example, the range of frequencies may be 1805-1910 MHz, where the receive frequency band filter module 20 may be tuned for a frequency response of 1805-1880 MHz, of 1850-1910 MHz, or 1850-1880 MHz.

Regardless of the protocol of the first or second received RF signals 46 and 54, the receive frequency band filter module 20 filters them and passes them to the low noise amplifier 22. The low noise amplifier 22 amplifies the first received RF signal 46 to produce a first inbound RF signal 48 and amplifies the second received RF signal 54 to produce a second inbound RF signal 56.

The down-conversion module 16, when in a first mode 35 (e.g., GSM, EDGE, GPRS), converts the first RF signal 48 into a first inbound symbol stream 50 and, when in a second mode 35 (e.g., WCDMA, HSDPA), converts the second RF signal 56 into a second inbound symbol stream 58. In one embodiment, the down-conversion module 16 extracts Cartesian coordinates from the first or second inbound RF signal 48 or 54 to produce the first or second inbound symbol stream 50 or 58. In another embodiment, the down-conversion module 16 extracts Polar coordinates from the first or second inbound RF signal 48 or 54 to produce the first or second inbound symbol stream 50 or 58. In yet another embodiment, the down-conversion module 16 extracts hybrid coordinates from the first or second inbound RF signal 48 or 54 to produce the first or second inbound symbol stream 50 or 58.

The baseband processing module 12, when in the first mode 35, converts the first inbound symbol stream 50 into a first inbound signal, or data, 52 and, when in the second mode 35, converts the second inbound symbol stream 58 into a second inbound signal, or data, 60. The baseband processing module 12 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound symbol streams 50 and 58 into the inbound signals 52 and 60.

Figure 2:
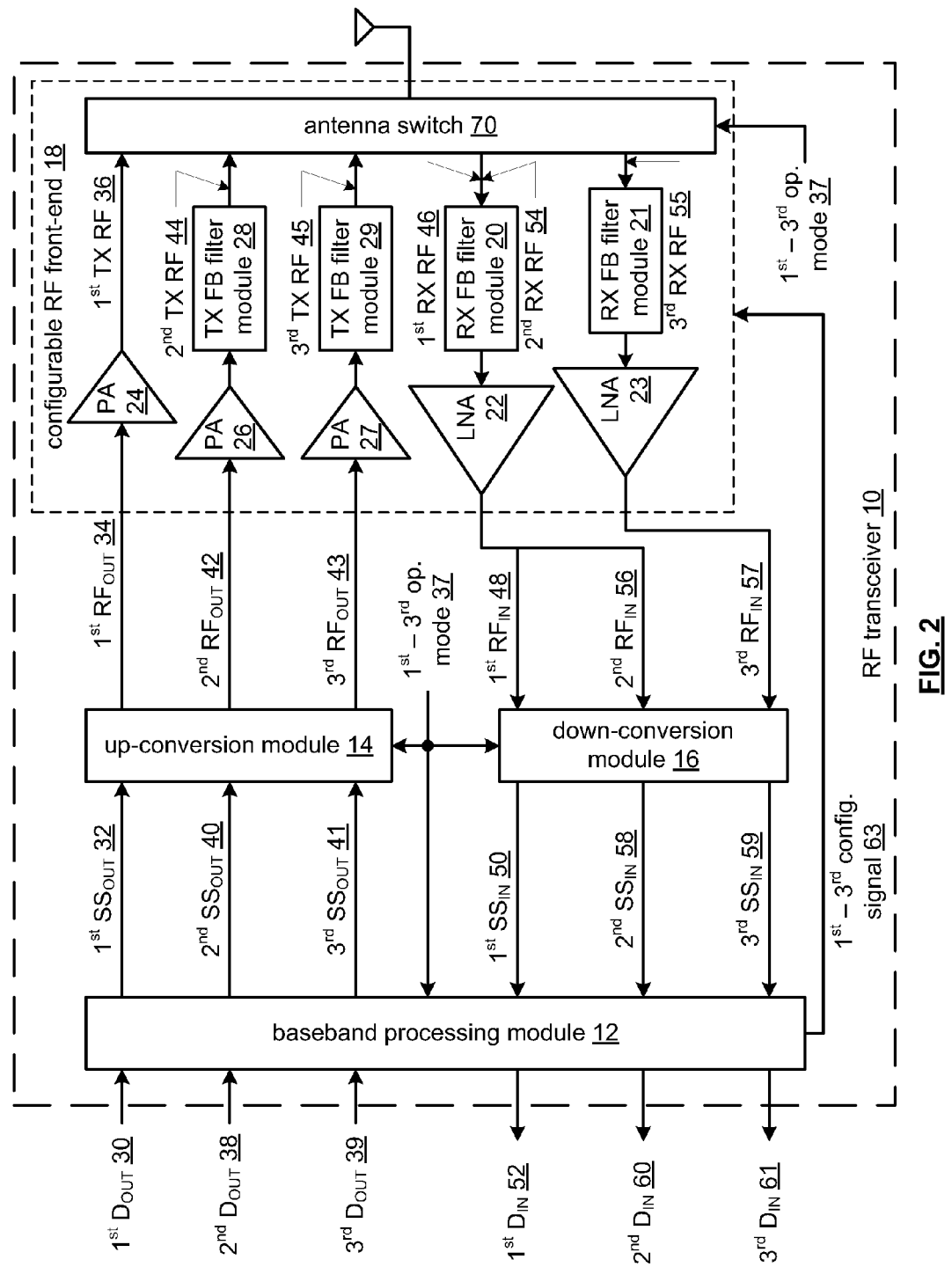
FIG. 2 is a schematic block diagram of another embodiment of an RF transceiver in accordance with the present invention.

FIG. 2 is a schematic block diagram of another embodiment of an RF transceiver 10 includes the baseband processing module 12, the up-conversion module 14, the down-conversion module 16, and the configurable RF front-end 18. The configurable RF front-end 18 includes the first receiver (RX) frequency band (FB) filter module 20, a second RX frequency band filter module 21, the low noise amplifier (LNA) 22, a second low noise amplifier 23, the first power amplifier (PA) module 24, the second power amplifier (PA) module 26, a third power amplifier (PA) module 27, the first transmitter (TX) frequency band (FB) filter module 28, a second TX frequency band filter module 29, and an antenna switch 70.

The transceiver 10 of FIG. 2 processes the first outbound data, or signal, 30 into the first transmit RF signal 36, processes the second outbound data, or signal, 38 into the second transmit RF signal 44, processes the first received RF signal 46 into the first inbound signal, or data, 52, and processes the second received RF signal 54 into the second inbound signal, or data, 60 as described with reference to FIG. 1. The antenna switch 70, when in the first mode, passes the first transmit RF signal 36 to the at least one antenna (which may include one or more antennas and an antenna interface) for transmission and passes the first receive RF signal 46 to the first receive frequency band filter module 20. When the transceiver 10 is in the second mode, the antenna switch 70 provides the second transmit RF signal 44 to the antenna for transmission and passes the second received RF signal 54 to the first receive frequency band filter module 20.

In addition to processing the first and second signals, the transceiver 10 of FIG. 2 processes a third outbound signal, or data, 39 into a third transmit RF signal 45 and processes a third receive RF signal into a third inbound signal, or data, 61 when in a third mode. In the third mode 37, the baseband processing module 12 converts a third outbound signal, or data, 39 into a third outbound symbol stream (SS) 41 in accordance with one or more existing wireless communication standards, new wireless communication standards, modifications thereof, and/or extensions thereof (e.g., GSM, AMPS, digital AMPS, CDMA, EDGE, GPRS, HSUPA, HSDPA, WCDMA, etc.). The baseband processing module 12 may perform one or more of scrambling, encoding, constellation mapping, modulation, frequency spreading, frequency hopping, beamforming, space-time-block encoding, space-frequency-block encoding, and/or digital baseband to IF conversion to convert the third outbound data 39 into the third outbound symbol stream 41. Depending on the desired formatting of the third outbound symbol stream 41, the baseband processing module 12 may generate the third outbound symbol stream 41 as Cartesian coordinates (e.g., having an in-phase signal component and a quadrature signal component to represent a symbol), as Polar coordinates (e.g., having a phase component and an amplitude component to represent a symbol), or as hybrid coordinates.

The up-conversion module 14 receives the third outbound symbol stream 41 as Cartesian coordinates, polar coordinates, or hybrid coordinates. Regardless of the coordinate formatting of the third outbound symbol stream 41, the up-conversion module 14 converts the third outbound symbol stream 41 into a third outbound RF signal 43 in accordance with the one or more existing wireless communication standards, new wireless communication standards, modifications thereof, and/or extensions thereof (e.g., GSM, AMPS, digital AMPS, CDMA, EDGE, GPRS, HSUPA, HSDPA, WCDMA, etc.).

The third power amplifier module 27, which may include one or more power amplifiers and/or power amplifier drivers coupled in series and/or in parallel, amplifies the third outbound RF signal 43 to produce an amplified third outbound RF signal. The TX frequency band filter module 29, which may be a bandpass filter, a surface acoustic wave (SAW) filter, or a transmitter portion of a duplexer, filters the amplified third outbound RF signal to produce a third transmit RF signal 45. The antenna switch 70 provides the third transmit RF signal 45 to the at least one antenna for transmission.

In an embodiment, the TX frequency band filter module 29 has a frequency response corresponding to a transmit channel of one or more wireless communication standards. For example, the TX frequency band filter module 29 may have a frequency response in the range of 1710-1785 MHz to accommodate GSM 1800, WCDMA Bands III, IV, and IX. As another example, the TX frequency band filter module 29 may have a frequency response in the range of 1920-1990 MHz to accommodate WCDMA Bands I and II.

For the third received (RX) RF signal 55, the antenna switch provides the signal 55 to the second receive frequency band filter module 21, which filters the signal 55 to produce a third filtered RX RF signal. The third received RF signal 55 may be formatted in accordance with one or more protocols (e.g., HSDPA, WCDMA for one signal and GSM, EDGE, GPRS for the other) but will have similar down link bandwidths. For example, PCS1800 has a down link bandwidth of 1805-1880 MHz, while WCDMA Band II has a down link bandwidth of 1850-1910, Band III has a down link bandwidth of 1805-1880, and Band IX has a down link bandwidth of 1850-1880 MHz. With these down link bandwidths, the second receive frequency band filter module 21, which may be a bandpass filter, a SAW filter, or a receive portion of a duplexer, may have a frequency response to filter these four protocols (e.g., frequency response having a bandpass region of 1805-1910 MHz) or it may have a frequency response to filter less than all four (e.g., 1805-1880 MHz). In another embodiment, the second receive frequency band filter module 21 may have an adjustable frequency response within a range of frequencies. For example, the range of frequencies may be 1805-1910 MHz, where the second receive frequency band filter module 21 may be tuned for a frequency response of 1805-1880 MHz, of 1850-1910 MHz, or 1850-1880 MHz.

Regardless of the protocol of the third received RF signal 55, the second receive frequency band filter module 21 filters it and passes the filtered signal to the second low noise amplifier 23. The second low noise amplifier 23 amplifies the filtered third received RF signal to produce a third inbound RF signal 57.

The down-conversion module 16, when in a third mode 37 (e.g., GSM, EDGE, GPRS, WCDMA, HSDPA), converts the third RF signal 57 into a third inbound symbol stream 59. In one embodiment, the down-conversion module 16 extracts Cartesian coordinates from the third inbound RF signal 57 to produce the third inbound symbol stream 59. In another embodiment, the down-conversion module 16 extracts Polar coordinates from the third inbound RF signal 55 to produce the third inbound symbol stream 59. In yet another embodiment, the down-conversion module 16 extracts hybrid coordinates from the third inbound RF signal 55 to produce the third inbound symbol stream 59.

The baseband processing module 12, when in the third mode 35, converts the third inbound symbol stream 59 into the third inbound signal, or data, 61. The baseband processing module 12 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the third inbound symbol streams 59 into the third inbound signal, or data, 61.

Figure 3:
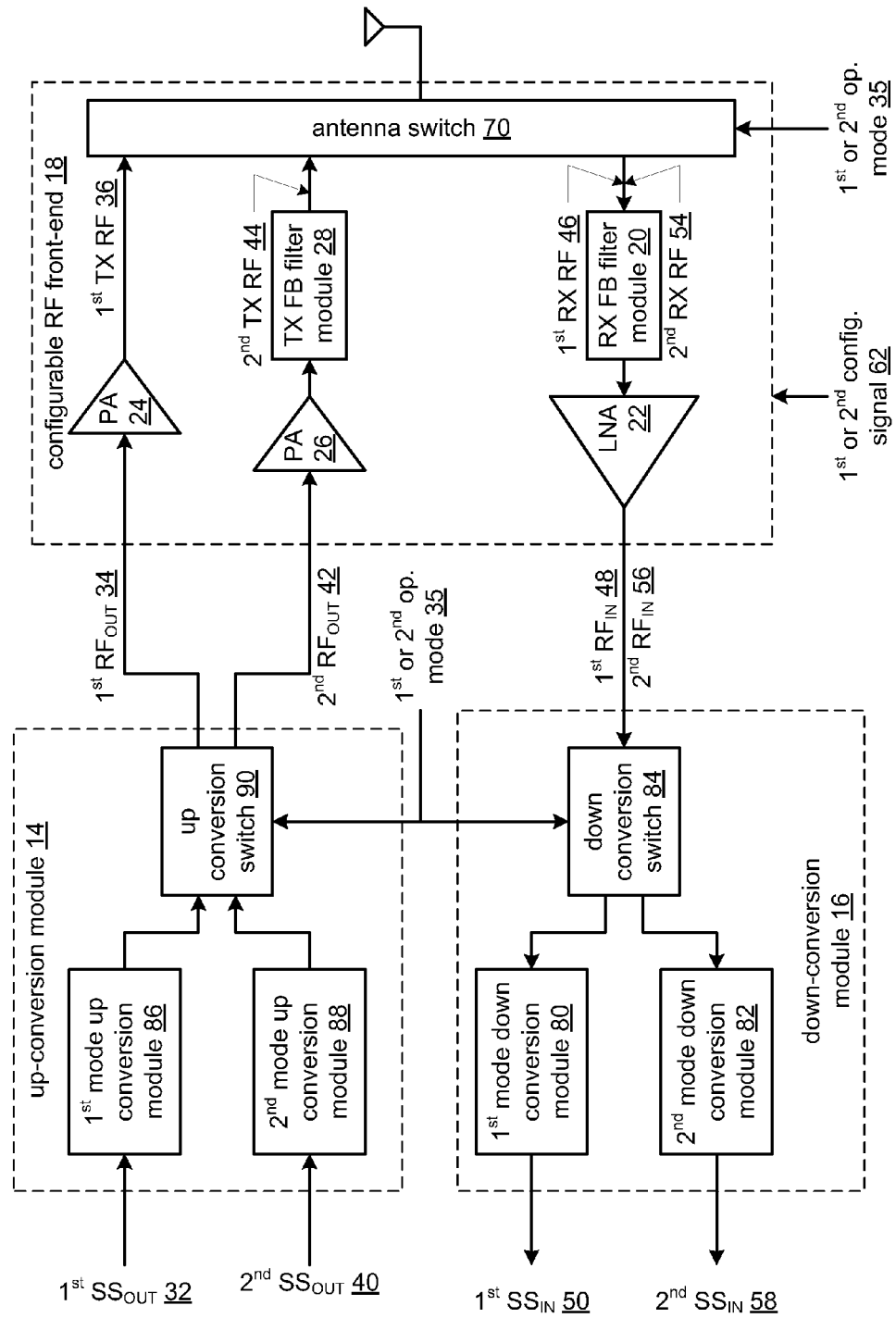
FIG. 3 is a schematic block diagram of an embodiment of an RF front-end in accordance with the present invention.

FIG. 3 is a schematic block diagram of an embodiment of an RF front-end 18 coupled to the up-conversion module 14 and to the down-conversion module 16. The RF front-end 18 includes the first PA module 24, the second PA module 26, the transmit frequency band filter module 28, the receive frequency band filter module 20, the low noise amplifier 22, and the antenna switch 70. The up-conversion module 14 includes a first mode up conversion module 86, a second mode up conversion module 88, and an up conversion switch 90. The down conversion module 16 includes a first mode down conversion module 80, a second mode down conversion module 82, and a down conversion switch 84.

When the transceiver is in the first mode 35, the first mode up-conversion module 86 converts the first outbound symbol stream 32 into the first outbound RF signal 34. In one embodiment, the first mode up-conversion module 86 includes mixers and a combining module to convert the first outbound symbol stream 32, as Cartesian coordinates, into the first outbound RF signal 34. In this embodiment, a first mixer mixes the in-phase components of the first outbound symbol stream 32 with an in-phase local oscillation to produce a first mixed signal and a second mixer mixes the quadrature components of the first outbound symbol stream 32 to produce a second mixed signal. The combining module combines (e.g., adds, subtracts, and/or filters) the first and second mixed signals to produce the first outbound RF signal 34.

In another embodiment, the first mode up-conversion module 86 includes an oscillator and a modulation module. In this embodiment, the oscillator generates a local oscillation. The modulation module modulates the oscillation based on phase information of the first outbound symbol stream 32, which is in polar or hybrid coordinates, to produce a phase modulated RF signal as the first outbound RF signal 34.

The up-conversion switch 90, which may be an RF switch, provides the first outbound RF signal 34 to the first power amplifier module 24. The first power amplifier module 24 amplifies the first outbound RF signal 34 to produce a first transmit RF signal 36. The antenna switch 70 provides the first transmit RF signal 36 to the at least on antenna for transmission. Note that if the polar coordinates or hybrid coordinates includes amplitude modulation information, the power amplifier 24 amplifies the first outbound RF signal 34 in accordance with the amplitude modulation information to produce the first transmit RF signal 36.

When the transceiver is in the second mode 35, the second mode up-conversion module 88 converts the second outbound symbol stream 40 into the second outbound RF signal 42. In one embodiment, the second mode up-conversion module 88 includes mixers and a combining module to convert the second outbound symbol stream 40, as Cartesian coordinates, into the second outbound RF signal 42. In this embodiment, a first mixer mixes the in-phase components of the second outbound symbol stream 40 with an in-phase local oscillation to produce a first mixed signal and a second mixer mixes the quadrature components of the second outbound symbol stream 40 to produce a second mixed signal. The combining module combines (e.g., adds, subtracts, and/or filters) the first and second mixed signals to produce the second outbound RF signal 42.

In another embodiment, the second mode up-conversion module 88 includes an oscillator and a modulation module. In this embodiment, the oscillator generates a local oscillation. The modulation module modulates the oscillation based on phase information of the second outbound symbol stream 40, which is in polar or hybrid coordinates, to produce a phase modulated RF signal as the second outbound RF signal 42.

The up-conversion switch 90 provides the second outbound RF signal 42 to the second power amplifier module 26. The second power amplifier module 26 amplifies the second outbound RF signal 42 to produce an amplified second outbound RF signal. The TX frequency band filter module 28 filters the amplified second outbound RF signal to produce a second transmit RF signal 44. The antenna switch 70 provides the second transmit RF signal 44 to the at least on antenna for transmission. Note that if the polar coordinates or hybrid coordinates includes amplitude modulation information, the power amplifier 26 amplifies the second outbound RF signal 42 in accordance with the amplitude modulation information to produce the second transmit RF signal 44.

When the transceiver is in the first mode 35 and is receiving a first RF signal, the antenna switch 70 provides the first receive RF signal 46 to receive frequency band filter module 20. The receive frequency band filter module 20 is configured (e.g., has its band pass region set, roll-off rate set, quality factor set, etc.) in accordance with a first configuration signal 62. In this configuration, the receive frequency band filter module 20 filters the received RF signal 46.

The low noise amplifier 22, which may be configured in accordance with the first configuration signal 62 (e.g., gain setting, sensitivity setting, bandwidth, etc), to amplify the first received RF signal 46. The low noise amplifier 22 provides the first inbound RF signal 48 to the down conversion switch 84, which may be an RF switch.

The down conversion switch 84 provides the first inbound RF signal 48 to the first mode down-conversion module 80. The first mode down-conversion module 80 may include a pair of mixers, a combining module, and/or filter modules to convert the first RF signal 48 into the first inbound symbol stream 50. In one embodiment, the first mode down-conversion module 80 extracts Cartesian coordinates from the first inbound RF signal 48 to produce the first inbound symbol stream 50. In another embodiment, the first mode down-conversion module 80 extracts Polar coordinates from the first inbound RF signal 48 to produce the first inbound symbol stream 50. In yet another embodiment, the first mode down-conversion module 80 extracts hybrid coordinates from the first inbound RF signal 48 to produce the first inbound symbol stream 50.

When the transceiver is in the second mode 35 and is receiving a second RF signal, the antenna switch 70 provides the second receive RF signal 54 to receive frequency band filter module 20. The receive frequency band filter module 20 is configured (e.g., has its band pass region set, roll-off rate set, quality factor set, etc.) in accordance with a second configuration signal 62. In this configuration, the receive frequency band filter module 20 filters the second received RF signal 54.

The low noise amplifier 22, which may be configured in accordance with the second configuration signal 62 (e.g., gain setting, sensitivity setting, bandwidth, etc), to amplify the second received RF signal 54. The low noise amplifier 22 provides the second inbound RF signal 56 to the down conversion switch 84.

The down conversion switch 84 provides the second inbound RF signal 56 to the second mode down-conversion module 82. The second mode down-conversion module 82 may include a pair of mixers, a combining module, and/or filter modules to convert the second RF signal 56 into the second inbound symbol stream 58. In one embodiment, the second mode down-conversion module 82 extracts Cartesian coordinates from the second inbound RF signal 56 to produce the second inbound symbol stream 58. In another embodiment, the second mode down-conversion module 82 extracts Polar coordinates from the second inbound RF signal 56 to produce the second inbound symbol stream 58. In yet another embodiment, the second mode down-conversion module 82 extracts hybrid coordinates from the second inbound RF signal 56 to produce the second inbound symbol stream 58.

FIG. 4 is a schematic block diagram of another embodiment of an RF front-end that may be used in the transceiver of FIGS. 1-3. In this embodiment, the RF front-end includes the antenna switch 70, which is coupled to at least one antenna 108, a first receiver frequency band filter module 100, a second receiver frequency band filter module 102, a first transmitter frequency band filter module 104, and a second transmitter frequency band filter module 106. Note that, in an embodiment, the at least one antenna includes a transmit antenna and a receive antenna. In this embodiment, the antenna switch 70 may include a receiver antenna switch and a transmitter antenna switch coupled to the corresponding antennas.

The first receiver frequency band filter module 100 has a first receiver frequency band pass region that corresponds to one of more channels of a wireless communication protocol of a first inbound RF signal. As such, the carrier frequency of first inbound RF signal is within the one or more channels. When the transceiver is in the first mode, the antenna switch couples the first receiver frequency band filter module 100 to the at least one antenna 100 to receive the first inbound RF signal. The first receiver frequency band filter module 100 filters the first inbound RF signal to produce a first filtered inbound RF signal. Note that the first receiver frequency band filter module 100 may be configurable such that its band pass region is adjusted in accordance with the mode of the transceiver and/or a configuration signal.

The second receiver frequency band filter module 102 has a second receiver frequency band pass region that corresponds to one of more channels of a wireless communication protocol of a second inbound RF signal. As such, the carrier frequency of second inbound RF signal is within the one or more channels. When the transceiver is in the second mode, the antenna switch couples the second receiver frequency band filter module 102 to the at least one antenna 100 to receive the second inbound RF signal. The second receiver frequency band filter module 102 filters the second inbound RF signal to produce a second filtered inbound RF signal. Note that the second receiver frequency band filter module 102 may be configurable such that its band pass region is adjusted in accordance with the mode of the transceiver and/or a configuration signal.

The first transmitter frequency band filter module 104 has a first transmit frequency band pass region that corresponds to one of more channels of a wireless communication protocol of a first outbound RF signal. As such, the carrier frequency of first outbound RF signal is within the one or more channels. The first transmitter frequency band filter module 104 filters the first outbound RF signal to produce a first filtered outbound RF signal. When the transceiver is in the first mode, the antenna switch couples the first transmitter frequency band filter module 104 to the at least one antenna 100 to transmit the first outbound RF signal. Note that the first transmitter frequency band filter module 104 may be configurable such that its band pass region is adjusted in accordance with the mode of the transceiver and/or a configuration signal.

The second transmitter frequency band filter module 106 has a second transmit frequency band pass region that corresponds to one of more channels of a wireless communication protocol of a second outbound RF signal. As such, the carrier frequency of second outbound RF signal is within the one or more channels. The second transmitter frequency band filter module 106 filters the second outbound RF signal to produce a second filtered outbound RF signal. When the transceiver is in the second mode, the antenna switch couples the second transmitter frequency band filter module 106 to the at least one antenna 100 to transmit the second outbound RF signal. Note that the second transmitter frequency band filter module 106 may be configurable such that its band pass region is adjusted in accordance with the mode of the transceiver and/or a configuration signal.

FIG. 5 is a diagram of an example of various protocols (e.g., A-H) having differing transmit and receive frequencies. While the specific transmit and receive frequencies for each protocol may be different, they may be generally categorized into frequency bands. For example, Band 1 has a receive frequency band 1 and a transmit frequency band 1 in which protocols B, D, E, F and H lie. As a further example, Band 2 has a receive frequency band 2 and a transmit frequency band 2 in which protocols A, C, and G lie.

In this example, a receive frequency band filter module (e.g., module 100 of FIG. 4) may have its bandpass region to correspond to receive frequency band 1. Thus, whenever the transceiver is supporting any of protocols B, D, E, F and H, the receiver frequency band filter module (e.g., 100) is used, which reduces the number of filter modules needed in the RF front end for a multiple protocol transceiver. The receiver frequency band filter module (e.g., 100) may be adjustable within the receive frequency band 1 based on the particular protocol. For example, protocol H consumes nearly all of the receive frequency band 1, thus the receive frequency band filter module would have its bandpass region approximately equal to the receive frequency band 1. If, however, protocol E is being used, the receive frequency band filter module would have its bandpass region adjusted to approximate that corresponding to protocol E.

Similarly, a second receive frequency band filter module (e.g., module 102 of FIG. 4) may have its bandpass region to correspond to receive frequency band 2. Thus, whenever the transceiver is supporting any of protocols A, C, and G, the second receiver frequency band filter module (e.g., 102) is used. The second receive frequency band filter module (e.g., 102) may be adjustable within the receive frequency band 2 based on the particular protocol. For example, protocol G consumes nearly all of the receive frequency band 2, thus the second receive frequency band filter module would have its bandpass region approximately equal to the receive frequency band 2. If, however, protocol C is being used, the second receive frequency band filter module would have its bandpass region adjusted to approximate that corresponding to protocol C.

On the transmit side, a transmitter frequency band filter module (e.g., module 104 of FIG. 4) may have its bandpass region to correspond to transmit frequency band 1. Thus, whenever the transceiver is supporting any of protocols B, D, E, F and H, the transmitter frequency band filter module (e.g., 104) is used, which reduces the number of filter modules needed in the RF front end for a multiple protocol transceiver. The transmitter frequency band filter module (e.g., 104) may be adjustable within the transmit frequency band 1 based on the particular protocol. For example, protocol H consumes nearly all of the transmit frequency band 1, thus the transmitter frequency band filter module would have its bandpass region approximately equal to the transmit frequency band 1. If, however, protocol E is being used, the transmitter frequency band filter module would have its bandpass region adjusted to approximate that corresponding to protocol E.

Similarly, a second transmitter frequency band filter module (e.g., module 106 of FIG. 4) may have its bandpass region to correspond to transmit frequency band 2. Thus, whenever the transceiver is supporting any of protocols A, C, and G, the second transmitter frequency band filter module (e.g., 106) is used. The second transmitter frequency band filter module (e.g., 106) may be adjustable within the transmit frequency band 2 based on the particular protocol. For example, protocol G consumes nearly all of the transmit frequency band 2, thus the second transmitter frequency band filter module would have its bandpass region approximately equal to the transmit frequency band 2. If, however, protocol C is being used, the second transmitter frequency band filter module would have its bandpass region adjusted to approximate that corresponding to protocol C.

Figure 6:
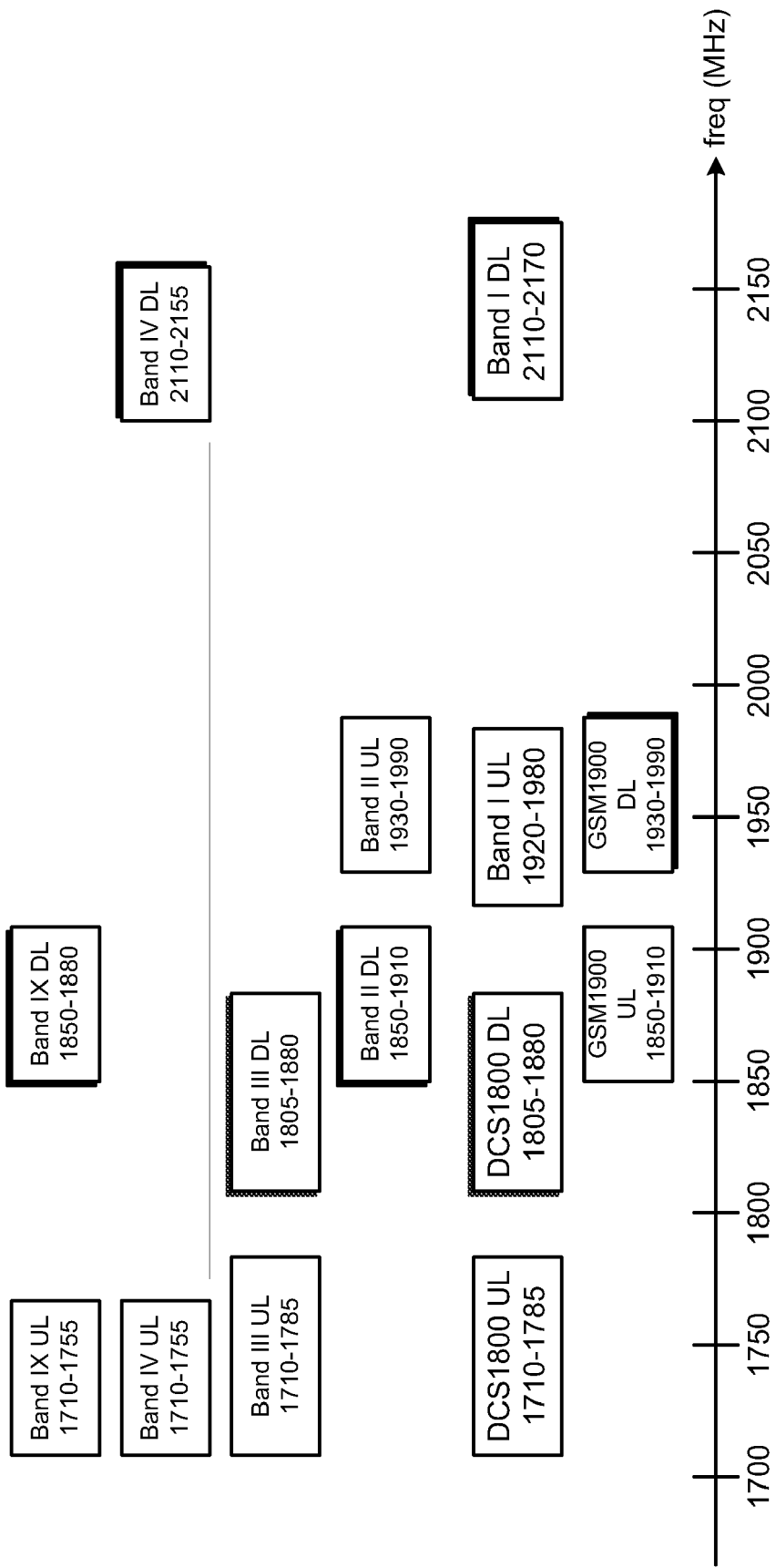
FIG. 6 is a diagram of another example of various protocols in accordance with the present invention.

FIG. 6 is a diagram of another example of various protocols of GSM and WCDMA. In this diagram DL stands for down link, which, from a mobile device's perspective, is the receive path and UL stands for up link, which, from a mobile device's perspective, is the transmit path. Further, this diagram includes two GSM based frequency bands (e.g., DCS 1800 and GSM 1900) and five WCDMA based frequency bands (e.g., Band I, II, III, IV, and IX).

In this diagram, DCS 1800 DL has the same receive frequency band as WCDMA Band III, which is 1805-1880 MHz. As such, whenever a transceiver is supporting one of these protocols, the same receive frequency band filter module may be used. The same receiver frequency band filter module may also be used if the transceiver is supporting WCDMA band IX, which as a DL frequency band of 1850-1880 MHz. If the bandwidth of the receive frequency band filter module is adjusted to include a band pass of 1805-1910 MHz, then the same receiver frequency band filter module may be used whenever the transceiver is supporting WCDMA Band II. If the receiver frequency band filter module is adjustable, when the transceiver is supporting WCDMA Band II or IX, the filter module may have its bandpass region to correspond to the DL frequency band of the corresponding protocol.

The same receive frequency band filter module may also be used when the transceiver is supporting WCDMA band I or IV. Further, the same transmitter frequency band filter module may be used when the transceiver is supporting DCS 1800 and WCDMA band III, which have the same UL frequency band of 1710-1785 MHz. The same transmitter frequency band filter module may also be used for WCDMA bands IV and IX, since their UL frequency bands are within the UL frequency band of the other protocols mentioned. Note that if the transmitter frequency band filter module is adjustable, its bandpass region may be adjusted to substantially match the UL frequency band of WCDMA bands IV and IX.

Figure 7:
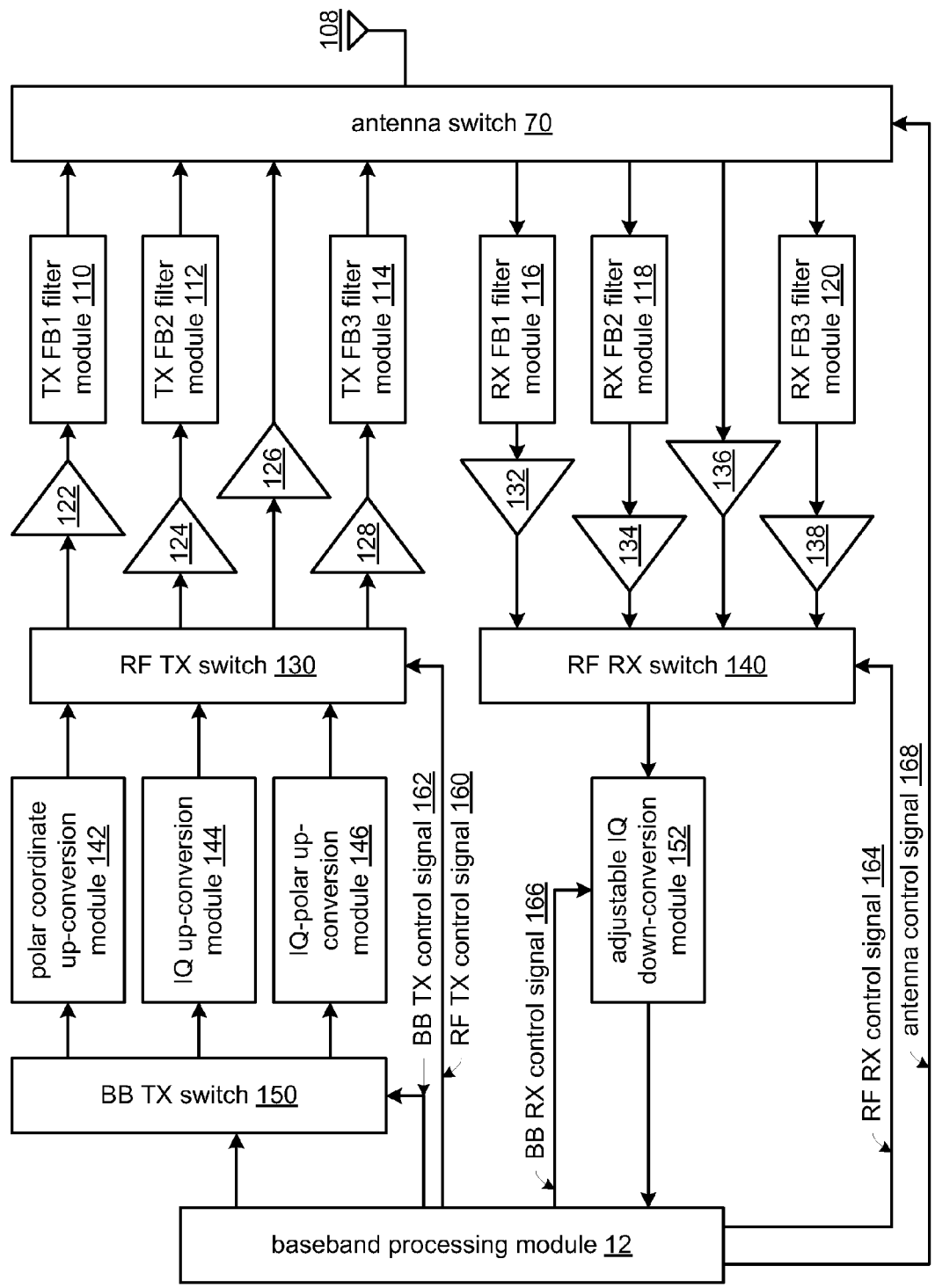
FIG. 7 is a schematic block diagram of another embodiment of an RF transceiver in accordance with the present invention.

FIG. 7 is a schematic block diagram of another embodiment of an RF transceivers that includes the baseband processing module 12, the antenna switch 70, a first transmitter frequency band filter module 110, a second transmitter frequency band filter module 112, a third transmitter frequency band filter module 114, a first receiver frequency band filter module 116, a second receiver frequency band filter module 118, a third receiver frequency band filter module 120, a plurality of power amplifier modules 122-128, a plurality of low noise amplifiers 132-138, an RF transmitter switch 130, an RF receiver switch 140, a polar coordinate up-conversion module 142, an IQ up-conversion module 144, an IQ-polar up conversion module 146 (e.g., a hybrid up-conversion module), a baseband transmitter switch 150, and an adjustable IQ down conversion module 152.

The baseband processing module 12 converts one of a plurality outbound signals, or data, into an outbound symbol stream (SS) 32 in accordance with one or more existing wireless communication standards, new wireless communication standards, modifications thereof, and/or extensions thereof. In accordance with an implementation of a protocol, the baseband processing module 12 formats the outbound symbol stream as Cartesian coordinates (e.g., having an in-phase signal component and a quadrature signal component to represent a symbol), as Polar coordinates (e.g., having a phase component and an amplitude component to represent a symbol), or as hybrid coordinates as disclosed in co-pending patent application entitled HYBRID RADIO FREQUENCY TRANSMITTER, having a filing date of Mar. 24, 2006, and an application number of Ser. No. 11/388,822, and co-pending patent application entitled PROGRAMMABLE HYBRID TRANSMITTER, having a filing date of Jul. 26, 2006, and an application number of Ser. No. 11/494,682.

Depending on the formatting of the outbound symbol stream, the baseband processing module 12 generates a baseband transmit control signal 162, which instructs the baseband transmit switch 150 to pass the outbound symbol stream to one of the up-conversion modules 142-146. For example, when the outbound symbol stream is formatted using polar coordinates, the switch 150 provides the outbound symbol stream to the polar coordinate up conversion module 142. As another example, when the outbound symbol stream is formatted using Cartesian coordinates, the switch 150 provides the outbound symbol stream to the IQ up conversion module 144. As yet another example, when the outbound symbol stream is formatted using hybrid coordinates, the switch 150 provides the outbound symbol stream to the hybrid up conversion module 146. Note that the up-conversion modules 142-146 may be adjustable in that the resulting up-converted signals may have one of a plurality of carrier frequencies depending on the particular protocol being implemented. For example, the polar coordinate up-conversion module 142 may be used to generate an up-converted signal for GSM 900, 1800, and/or 1900 by using different oscillator frequencies.

Depending on the frequency band of the up-converted signal and desired RF bandpass filtering, the baseband processing module 12 generates an RF transmit control signal 160. The RF transmit switch 130 provides the up-converted signal from one of the up-conversion modules 142-146 to one of the plurality of power amplifier modules 122-128 in accordance with the RF TX control signal 160. If the up-converted signal does not need RF bandpass filtering, then the switch provides the signal to power amplifier module 126, which amplifies the signals and provides the amplified signal to the antenna switch 70. The antenna switch 70 provides the outbound RF signal to the antenna 108 in accordance with the antenna control signal 168.

When the up-converted signal does need RF bandpass filtering, the switch 130 provides the signal to power amplifier 122 when the signal's carrier frequency is within the frequency band of transmitter frequency band filter module 110 in accordance with the control signal 160. Similar routing of the signal by the switch 130 occurs when the signal's frequency band is within the bandpass region of the second or third transmitter frequency band filter module 112 or 114. Note that each of the plurality of power amplifier modules 122-128 may include one or more power amplifiers and/or power amplifier drivers coupled in series and/or in parallel.

For received (RX) RF signals, antenna switch 70 provides a received RF signal to one of the first-third receiver frequency band filter modules 116-120 or to the low noise amplifier 136 based on the antenna control signal 168. The baseband processing module 12 generates the antenna control signal 168 based on the carrier frequency of the inbound RF signal and whether the inbound RF signal needs RF bandpass filtering. When the inbound RF signal does not need filtering, the antenna control signal 168 is generated to cause the antenna switch 70 to provide the inbound RF signal to low noise amplifier 136.

When the inbound RF signal does need filtering, the baseband processing module generates the antenna control signal 168 to cause the antenna switch to provide the inbound RF signal to one of the receiver frequency band filter modules 116-120. For example, when the inbound RF signal's carrier frequency is within the frequency band of the first RX FB filter module 116, the control signal 168 causes the antenna switch to provide the inbound RF signal to the first filter module 116. Similarly, when the carrier frequency of the inbound RF signal is within the frequency band of the second filter module 118, the control signal 168 causes the antenna switch 70 to provide the inbound RF signal to the second filter module 118. The same occurs for the third filter module 120. Note that the baseband processing module 12 determines the frequency band of the inbound RF signal based on the particular mode of the transceiver (e.g., whether the transceiver is in a GSM 900 mode, a GSM 1800 mode, a GSM 1900 mode, a WCDMA band I, band II, etc. mode). Further note that each of the filter modules 110-120 may be a bandpass filter, a SAW filter, or a portion of a duplexer.

The RF receiver switch 140 passes the amplified inbound RF signal from one of the low noise amplifiers 132-138 to the adjustable down conversion module 152 based on an RF receiver control signal 164 that is generated by the baseband processing module 12. The down-conversion module 152 converts, in accordance with a baseband receiver control signal 166, the inbound RF signal into an inbound symbol stream. In one embodiment, the down-conversion module 152 extracts Cartesian coordinates from the inbound RF signal to produce the inbound symbol stream. In another embodiment, the down-conversion module 152 extracts Polar coordinates from the inbound RF signal to produce the inbound symbol stream. In yet another embodiment, the down-conversion module 152 extracts hybrid coordinates from the inbound RF signal to produce the inbound symbol stream. Note that the baseband receiver control signal 166 may cause the down conversion module 152 to use a different oscillation rate to down convert the various inbound RF signals into the baseband inbound symbol stream.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) front-end comprises:
   an antenna switch coupled to at least one antenna;
   a first receiver frequency band filter module having a first receiver frequency band pass region, wherein the antenna switch couples the first receiver frequency band filter module to the at least one antenna when a first inbound RF signal is received, wherein the first inbound RF signal is formatted in accordance with a first one of a plurality of protocols having a carrier frequency within the first receiver frequency band pass region, and wherein the first receiver frequency band filter module filters the first inbound RF signal to produce a first filtered inbound RF signal;
   a second receiver frequency band filter module having a second receiver frequency band pass region, wherein the antenna switch couples the second receiver frequency band filter module to the at least one antenna when a second inbound RF signal is received, wherein the second inbound RF signal is formatted in accordance with a second one of the plurality of protocols having a carrier frequency within the second receiver frequency band pass region, and wherein the second receiver frequency band filter module filters the second inbound RF signal to produce a second filtered inbound RF signal;
   a first transmitter frequency band filter module having a first transmit frequency band pass region, wherein, when enabled, the first transmitter frequency band filter module filters a first outbound RF signal to produce a first filtered outbound RF signal, wherein the first outbound RF signal is formatted in accordance with the first one of the plurality of protocols having a carrier frequency within the first transmit frequency band pass region; and
   a second transmitter frequency band filter module having a second transmit frequency band pass region, wherein, when enabled, the second transmitter frequency band filter module filters a second outbound RF signal to produce a second filtered outbound RF signal, wherein the second outbound RF signal is formatted in accordance with the second one of the plurality of protocols having a carrier frequency within the second transmit frequency band pass region and wherein the antenna switch couples the first or the second transmitter frequency band filter module to the at least one antenna in accordance with the enabling of the first or the second transmitter frequency band filter module.

2. The RF front-end of claim 1 further comprises:
   a first low noise amplifier (LNA) coupled to amplify the first filtered inbound RF signal to produce a first amplified inbound RF signal; and
   a second LNA coupled to amplify the second filtered inbound RF signal to produce a second amplified inbound RF signal.

3. The RF front-end of claim 2 further comprises:
   a down conversion module; and
   a down conversion switch coupled to pass the first amplified inbound RF signal to the down conversion module when the RF front-end is in a first down conversion mode and coupled to pass the second amplified inbound RF signal to the down conversion module when the RF front-end is in a second down conversion mode, wherein the down conversion module converts the first or second amplified inbound RF signal into a first or second inbound symbol stream.

4. The RF front-end of claim 3, wherein the down conversion module comprises:
   a first mode down conversion module coupled to convert the first amplified inbound RF signal into the first inbound symbol stream; and
   a second mode down conversion module coupled to convert the second amplified inbound RF signal into the second inbound symbol stream.

5. The RF front-end of claim 3 further comprises:
a third LNA, wherein, when the antenna switch couples the third LNA to the at least one antenna, the third LNA amplifies the inbound RF signal to produce a third amplified inbound RF signal, wherein the third LNA provides the third amplified inbound RF signal to the down conversion module.

6. The RF front-end of claim 1 further comprises:
a third receiver frequency band filter module having a third receiver frequency band pass region, wherein, when the antenna switch couples the third receiver frequency band filter module to the at least one antenna, the third receiver frequency band filter module filters the inbound RF signal to produce a third filtered inbound RF signal.

7. The RF front-end of claim 1, wherein each of the first and second receiver frequency band filter modules comprises at least one of:
a bandpass filter;
a surface acoustic wave (SAW) filter; and
a receiver portion of a duplexer.

8. The RF front-end of claim 1 further comprises:
the at least one antenna including:
a transmit antenna for transmitting at least one of the first filtered outbound RF signal and the second filtered outbound RF signal; and
a receive antenna for receiving the inbound RF signal; and
the antenna switch including:
an receiver antenna switch for coupling the receive antenna to the first or second receiver frequency band filter module; and
a transmit antenna switch for coupling the transmit antenna to the first or second transmitter frequency band filter module.

9. The RF front-end of claim 1 further comprises:
a first power amplifier module coupled to amplify the first outbound RF signal prior to filtering by the first transmitter frequency band filter module; and
a second power amplifier module coupled to amplify the second outbound RF signal prior to filtering by the second transmitter frequency band filter module.

10. The RF front-end of claim 9 further comprises:
an up conversion module coupled to generate the first outbound RF signal from a first outbound symbol stream when the RF front-end is in a first up conversion mode and coupled to generate the second outbound RF signal from a second outbound symbol stream when the RF front-end is in a second up conversion mode; and
an up conversion switch coupled, in a first mode, to provide the first outbound RF signal to the first power amplifier module and, in a second mode, coupled to provide the second outbound RF signal to the second power amplifier module.

11. The RF front-end of claim 10, wherein the up conversion module comprises:
a first up conversion module coupled to generate the first outbound RF signal from the first outbound symbol stream when the RF front-end is in the first up conversion mode; and
a second mode up conversion module coupled to generate the second outbound RF signal from the second outbound symbol stream when the RF front-end is in the second up conversion mode.

12. The RF front-end of claim 10 further comprises:
a third power amplifier module, wherein, when the RF front-end is in a third up-conversion mode, the up conversion module is coupled to the antenna switch via the third power amplifier module.

13. The RF front-end of claim 1 further comprises:
a third transmitter frequency band filter module having a third transmit frequency band pass region, wherein, when enabled, the third transmitter frequency band filter module filters the outbound RF signal to produce a third filtered outbound RF signal, and wherein, when the antenna switch couples the third transmitter frequency band filter module to the at least one antenna, the at least one antenna transmits the third filtered outbound RF signal.

14. A radio frequency (RF) transceiver comprises:
a baseband processing module coupled to:
convert first outbound data into a first outbound symbol stream when the RF transceiver is in a first operational mode;
convert second outbound data into a second outbound symbol stream when the RF transceiver is in a second operational mode;
convert a first inbound symbol stream into first inbound data when the RF transceiver is in the first operational mode;
convert a second inbound symbol stream into second inbound data when the RF transceiver is in the second operational mode;
determine a first receive and transmit frequency bands based on the first operational mode;
determine a second receive and transmit frequency bands based on the second operational mode;
generate a first RF front-end configuration signal based on the first receive and transmit frequency bands; and
generate a second RF front-end configuration signal based on the second receive and transmit frequency bands;
an up conversion module coupled to:
convert the first outbound symbol stream into a first outbound RF signal when the RF transceiver is in the first operational mode; and
convert the second outbound symbol stream into a second outbound RF signal when the RF transceiver is in the second operational mode;
a down conversion module coupled to:
convert a first inbound RF signal into the first inbound symbol stream when the RF transceiver is in the first operational mode; and
convert a second inbound RF signal into the second inbound symbol stream when the RF transceiver is in the second operational mode;
a configurable RF front-end that includes:
a receiver frequency band filter module coupled to filter a received RF signal to produce a filtered received RF signal in accordance with the first or the second RF front-end configuration signal;
a low noise amplifier coupled to amplify the filtered received RF signal to produce the first inbound RF signal in accordance with the first RF front-end configuration signal and to produce the second inbound RF signal in accordance with the second RF front-end configuration signal;
a first power amplifier module enabled in accordance with the first RF front-end configuration signal to amplify the first outbound RF signal to produce a first transmit RF signal;
a second power amplifier module enabled in accordance with the second RF front-end configuration signal to amplify the second outbound RF signal to produce a second transmit RF signal; and
a transmitter frequency band filter module enabled in accordance with the second RF front-end configuration signal to filter the second transmit RF signal.

15. The RF transceiver of claim 14, wherein the configurable RF front-end further comprises:
an antenna switch that couples an antenna to the receiver frequency band filter module based on the first or the second RF front-end configuration signal, that couples the first power amplifier module to the antenna based on the first RF front-end configuration signal, and that couples the transmitter frequency band filter module to the antenna based on the second RF front-end configuration signal.

16. The RF transceiver of claim 14 further comprises:
the baseband processing module coupled to:
convert third outbound data into a third outbound symbol stream when the RF transceiver is in a third operational mode;
convert a third inbound symbol stream into third inbound data when the RF transceiver is in the third operational mode;
determine a third receive frequency band based on the third operational mode; and
generate a third RF front-end configuration signal based on the third receive frequency band;
the up conversion module coupled to:
convert the third outbound symbol stream into a third outbound RF signal when the RF transceiver is in the third operational mode;
the down conversion module coupled to:
convert a third inbound RF signal into the third inbound symbol stream when the RF transceiver is in the third operational mode;
the configurable RF front-end further includes:
a second receiver frequency band filter module coupled to filter a second received RF signal to produce a second filtered received RF signal in accordance with the third RF front-end configuration signal;
a second low noise amplifier coupled to amplify the second filtered received RF signal to produce the third inbound RF signal in accordance with the third RF front-end configuration signal;
a third power amplifier module enabled in accordance with the third RF front-end configuration signal to amplify the third outbound RF signal to produce a third transmit RF signal; and
a second transmitter frequency band filter module enabled in accordance with the third RF front-end configuration signal to filter the third transmit RF signal.

17. The RF transceiver of claim 14, wherein the down conversion module comprises:
a first mode down conversion module coupled to convert the first inbound RF signal into the first inbound symbol stream;
a second mode down conversion module coupled to convert the second inbound RF signal into the second inbound symbol stream; and
a down conversion switch coupled to pass the first inbound RF signal to the first mode down conversion module when the RF transceiver is in the first operational mode and coupled to pass the second inbound RF signal to the second mode down conversion module when the RF transceiver is in the second operational mode.

18. The RF transceiver of claim 14, wherein the up conversion module comprises:
a first mode up conversion module coupled to convert the first outbound symbol stream into the first outbound RF signal; and
a second mode up conversion module coupled to convert the second outbound symbol stream into the second outbound RF signal; and
an up conversion switch coupled to provide the first outbound RF signal to the first power amplifier module when the RF transceiver is in the first operational mode and to provide the second output RF signal to the second power amplifier module when the RF transceiver is in the second operational mode.

19. A radio frequency (RF) front-end comprises:
an antenna switch coupled to at least one antenna;
a receiver frequency band filter module having a receiver frequency band pass region, wherein, the antenna switch couples the receiver frequency band filter module to the at least one antenna when the RF front-end is in a first or second operational mode, and wherein the receiver frequency band filter module filters an inbound RF signal to produce a filtered inbound RF signal;
a low noise amplifier coupled to amplify the filtered inbound RF signal to produce an amplified inbound RF signal;
a first power amplifier module coupled to amplify a first outbound RF signal to produce a first amplified outbound RF signal;
a second power amplifier module coupled to amplify a second outbound RF signal to produce a second amplified outbound RF signal, wherein the antenna switch couples the second power amplifier module to the at least one antenna when the RF front-end is in the first operational mode; and
a transmitter frequency band filter module having a transmit frequency band pass region, wherein, when enabled, the transmitter frequency band filter module filters the first amplified outbound RF signal to produce a filtered outbound RF signal, and wherein, the antenna switch couples the transmitter frequency band filter module to the at least one antenna when the RF front-end is in the first operational mode.

20. The RF front-end of claim 19 further comprises:
a first mode down conversion module coupled to convert the amplified inbound RF signal into a first inbound symbol stream; and
a second mode down conversion module coupled to convert the amplified inbound RF signal into a second inbound symbol stream; and
a down conversion switch coupled to pass the amplified inbound RF signal to the first mode down conversion module when the RF front-end is in the first operational mode and coupled to pass the amplified inbound RF signal to the second mode down conversion module when the RF front-end is in the second operational mode.

21. The RF front-end of claim 19 further comprises:
a first up conversion module coupled to generate the first outbound RF signal from a first outbound symbol stream when the RF front-end is in the first operational mode;
a second mode up conversion module coupled to generate the second outbound RF signal from a second outbound symbol stream when the RF front-end is in the second operational mode; and
an up conversion switch coupled to provide the first outbound RF signal to the first power amplifier module when the RF front-end is in the first operational mode and coupled to provide the second outbound RF signal to the second power amplifier module when the RF front-end is in the second operational mode.

22. The RF front-end of claim 19, wherein the receiver frequency band filter modules comprises at least one of:
a bandpass filter;
a surface acoustic wave (SAW) filter; and
a receiver portion of a duplexer.

23. The RF front-end of claim 19, wherein the transmitter frequency band filter modules comprises at least one of:
  a bandpass filter;
  a surface acoustic wave (SAW) filter; and
  a transmitter portion of a duplexer.

24. The RF front-end of claim 19 further comprises:
  the at least one antenna including:
    a transmit antenna for transmitting at least one of the first amplified outbound RF signal and the filtered outbound RF signal; and
    a receive antenna for receiving the inbound RF signal; and
  the antenna switch for coupling the transmit antenna to the first power amplifier module or to the transmitter frequency band filter module.

* * * * *